US007840911B2

(12) United States Patent
Milener et al.

(10) Patent No.: US 7,840,911 B2
(45) Date of Patent: Nov. 23, 2010

(54) METHOD AND APPARATUS FOR ENHANCED BROWSING

(76) Inventors: Scott Milener, 2729 Lombard St. #1, San Francisco, CA (US) 94123; Wendell Brown, 4132 S. Rainbow Blvd., #494, Las Vegas, NV (US) 89103

(*) Notice: Subject to any disclaimer, the term of this patent is extended or adjusted under 35 U.S.C. 154(b) by 1144 days.

(21) Appl. No.: 10/986,509

(22) Filed: Nov. 10, 2004

(65) Prior Publication Data
US 2006/0070012 A1   Mar. 30, 2006

Related U.S. Application Data

(60) Provisional application No. 60/613,463, filed on Sep. 27, 2004.

(51) Int. Cl.
G06F 3/048   (2006.01)
(52) U.S. Cl. ....................... 715/822
(58) Field of Classification Search ......... 715/822
See application file for complete search history.

(56) References Cited

U.S. PATENT DOCUMENTS

| | | | |
|---|---|---|---|
| 5,307,086 A | | 4/1994 | Griffin et al. |
| 5,495,566 A | * | 2/1996 | Kwatinetz ............ 715/785 |
| 5,680,562 A | | 10/1997 | Conrad et al. |
| 5,715,445 A | | 2/1998 | Wolfe |
| 5,796,967 A | | 8/1998 | Filepp et al. |
| 5,805,815 A | | 9/1998 | Hill |
| 5,880,733 A | | 3/1999 | Horvitz et al. |
| 5,890,172 A | | 3/1999 | Borman et al. |
| 5,946,682 A | | 8/1999 | Wolfe |
| 5,973,688 A | * | 10/1999 | May ...................... 715/709 |
| 5,978,847 A | | 11/1999 | Kisor et al. |
| 5,991,713 A | | 11/1999 | Unger et al. |

(Continued)

FOREIGN PATENT DOCUMENTS

WO   WO 01/90912 A   11/2001

OTHER PUBLICATIONS

Alexa Snapshot, Alexa Toolbar; 8 pages printed Jan. 31, 2005 from http://www.alexa.com.

(Continued)

*Primary Examiner*—William L Bashore
*Assistant Examiner*—Henry Orr
(74) *Attorney, Agent, or Firm*—John R. Thompson; Stoel Rives LLP

(57) ABSTRACT

A method and apparatus for enhanced browsing of electronic data (e.g., web pages, documents, electronic mail). When a first page is displayed in a browser, content identified by links to other pages is prefetched. If the page contains a list of links (e.g., search results), an enhanced browsing stripe is superimposed on the links. The stripe is transparent or semi-transparent, so that a user can identify individual links in the list. As long as a user interface cursor remains within the stripe, whenever the cursor is placed over or adjacent to a link, an enhanced browsing window containing the prefetched content for that link is displayed. The stripe extends at least the length of the list of links. If the cursor reaches the end of the browser window, the browser page is automatically scrolled as necessary to view additional links or page content, and the stripe is extended accordingly.

40 Claims, 7 Drawing Sheets

U.S. PATENT DOCUMENTS

| | | | |
|---|---|---|---|
| 5,991,740 | A | 11/1999 | Messer |
| 6,025,844 | A | 2/2000 | Parsons |
| 6,035,330 | A | 3/2000 | Astiz et al. |
| 6,067,565 | A | 5/2000 | Horvitz |
| 6,085,226 | A | 7/2000 | Horvitz |
| 6,088,803 | A | 7/2000 | Tso et al. |
| 6,182,072 | B1 | 1/2001 | Leak et al. |
| 6,182,133 | B1 | 1/2001 | Horvitz |
| 6,199,098 | B1 | 3/2001 | Jones et al. |
| 6,208,354 | B1 | 3/2001 | Porter |
| 6,222,541 | B1* | 4/2001 | Bates et al. .................. 715/786 |
| 6,230,168 | B1 | 5/2001 | Unger et al. |
| 6,243,091 | B1 | 6/2001 | Berstis |
| 6,256,028 | B1 | 7/2001 | Sanford et al. |
| 6,262,724 | B1 | 7/2001 | Crow et al. |
| 6,301,576 | B1 | 10/2001 | Wolfe |
| 6,356,908 | B1 | 3/2002 | Brown et al. |
| 6,421,733 | B1 | 7/2002 | Tso et al. |
| 6,496,208 | B1 | 12/2002 | Bernhardt et al. |
| 6,584,498 | B2* | 6/2003 | Nguyen ...................... 709/219 |
| 6,604,103 | B1 | 8/2003 | Wolfe |
| 6,651,044 | B1 | 11/2003 | Stoneman |
| 6,667,751 | B1* | 12/2003 | Wynn et al. .................. 715/833 |
| 6,675,159 | B1 | 1/2004 | Lin et al. |
| 6,763,334 | B1 | 7/2004 | Matsumoto |
| 6,874,126 | B1 | 3/2005 | Lapidous |
| 7,007,237 | B1 | 2/2006 | Sharpe |
| 7,047,502 | B2 | 5/2006 | Petropoulos et al. |
| 7,117,443 | B1 | 10/2006 | Zilka et al. |
| 7,162,493 | B2 | 1/2007 | Weiss et al. |
| 7,167,875 | B2 | 1/2007 | Brown et al. |
| 7,296,230 | B2 | 11/2007 | Fukatsu et al. |
| 7,506,260 | B2 | 3/2009 | Wada et al. |
| 2001/0016845 | A1 | 8/2001 | Tribbensee |
| 2001/0029538 | A1 | 10/2001 | Blockton et al. |
| 2001/0040584 | A1* | 11/2001 | Deleeuw ...................... 345/629 |
| 2001/0047375 | A1 | 11/2001 | Fest |
| 2001/0050658 | A1 | 12/2001 | Adams |
| 2002/0030697 | A1 | 3/2002 | Oikawa |
| 2002/0057299 | A1 | 5/2002 | Oren et al. |
| 2002/0124022 | A1 | 9/2002 | Yoo |
| 2002/0126155 | A1* | 9/2002 | Lin-Hendel .................. 345/785 |
| 2002/0143826 | A1 | 10/2002 | Day et al. |
| 2002/0147779 | A1 | 10/2002 | Bates et al. |
| 2002/0147788 | A1* | 10/2002 | Nguyen ...................... 709/217 |
| 2002/0163545 | A1 | 11/2002 | Hii |
| 2002/0169828 | A1 | 11/2002 | Blanchard |
| 2002/0182578 | A1 | 12/2002 | Rachman et al. |
| 2002/0186249 | A1 | 12/2002 | Lu et al. |
| 2003/0023582 | A1 | 1/2003 | Bates et al. |
| 2003/0043193 | A1 | 3/2003 | Alegria et al. |
| 2003/0163454 | A1 | 8/2003 | Jacobsen et al. |
| 2004/0049541 | A1 | 3/2004 | Swahn |
| 2004/0054968 | A1 | 3/2004 | Savage |
| 2004/0064471 | A1 | 4/2004 | Brown et al. |
| 2004/0093562 | A1 | 5/2004 | Diorio et al. |
| 2004/0189696 | A1 | 9/2004 | Shirriff |
| 2004/0205514 | A1* | 10/2004 | Sommerer et al. ....... 715/501.1 |
| 2004/0205633 | A1 | 10/2004 | Martinez et al. |
| 2004/0250219 | A1 | 12/2004 | Sawada |
| 2005/0004844 | A1 | 1/2005 | Attia |
| 2005/0050443 | A1 | 3/2005 | Sachedina et al. |
| 2005/0086109 | A1 | 4/2005 | McFadden et al. |
| 2005/0119935 | A1 | 6/2005 | Boss et al. |
| 2005/0138143 | A1 | 6/2005 | Thompson |
| 2005/0198587 | A1 | 9/2005 | Pennell et al. |
| 2005/0235203 | A1 | 10/2005 | Undasan |
| 2006/0020904 | A1* | 1/2006 | Aaltonen et al. ............. 715/850 |
| 2006/0069617 | A1 | 3/2006 | Milener et al. |
| 2006/0069618 | A1 | 3/2006 | Milener et al. |
| 2006/0069996 | A1* | 3/2006 | Greaves ...................... 715/708 |
| 2006/0070012 | A1 | 3/2006 | Milener et al. |
| 2006/0074984 | A1 | 4/2006 | Milener et al. |
| 2006/0101341 | A1 | 5/2006 | Kelly et al. |
| 2006/0101514 | A1 | 5/2006 | Milener et al. |
| 2006/0143568 | A1 | 6/2006 | Milener et al. |

OTHER PUBLICATIONS

Answwwer Search Robot; 2 pages printed Jan. 31, 2005 from http://www.answwwer.net.
LostGoggles; 9 pages printed Jan. 31, 2005 from http://www.lostgoggles.com.
MicroSurfer; 5 pages printed Jan. 31, 2005 from http://www.microsurfer.com.
Surfie!; 16 pages printed Jan. 31, 2005 from http://www.speed-system.co.jp/en.
UCmore; 8 pages printed Jan. 31, 2005 from http://www.ucmore.com.
Viewpoint Toolbar; 3 pages printed Jan. 31, 2005 from http://www.viewpoint.com.
International Search Report and Written Opinion of the International Search Authority for International Application No. PCT/US2005/034852 (total of 9 pages).
W3Schools, "JavaScript Tutorial", http://www.w3schools.com/js/default.asp, http://web.archive.org/web/20021013180557/www.w3schools.com/js/default.asp, Oct. 13, 2002, printout pp. 1-3.
Wikipedia, "PHP programming language", http://www.wikipedia.org/wiki/PHP, http://web.archive.org/web/20030304011841/www.wikipedia.org/wiki/PHP, Mar. 4, 2003, printout pp. 1-2.
Office Action for U.S. Appl. No. 10/985,628, filed Nov. 10, 2004, mailed from USPTO on Jul. 25, 2007, 26 pgs.
Office Action for U.S. Appl. No. 10/985,628, filed Nov. 10, 2004, mailed from USPTO on Apr. 17, 2008, 30 pgs.
Office Action for U.S. Appl. No. 10/985,628, filed Nov. 10, 2004, mailed from USPTO on Sep. 3, 2008, 35 pgs.
Office Action for U.S. Appl. No. 10/985,628, filed Nov. 10, 2004, mailed from USPTO on Mar. 13, 2009, 28 pgs.
Office Action for U.S. Appl. No. 10/985,628, filed Nov. 10, 2004, mailed from USPTO on Nov. 24, 2009, 20 pgs.
Office Action for U.S. Appl. No. 10/985,553, filed Nov. 10, 2004, mailed from USPTO on Apr. 4, 2007, 19 pgs.
Office Action for U.S. Appl. No. 10/985,553, filed Nov. 10, 2004, mailed from USPTO on Nov. 1, 2007, 14 pgs.
Office Action for U.S. Appl. No. 10/985,553, filed Nov. 10, 2004, mailed from USPTO on Aug. 5, 2008, 23 pgs.
Office Action for U.S. Appl. No. 10/985,553, filed Nov. 10, 2004, mailed from USPTO on Jan. 6, 2009, 17 pgs.
Office Action for U.S. Appl. No. 10/985,553, filed Nov. 10, 2004, mailed from USPTO on Aug. 3, 2009, 21 pgs.
Office Action for U.S. Appl. No. 10/985,553, filed Nov. 10, 2004, mailed from USPTO on Feb. 4, 2010, 22 pgs.
Office Action for U.S. Appl. No. 11/180,261, filed Jul. 13, 2005, mailed from USPTO on Mar. 31, 2009, 25 pgs.
Office Action for U.S. Appl. No. 11/264,418, filed Nov. 1, 2005, mailed from USPTO on Aug. 3, 2009, 6 pgs.
Office Action for U.S. Appl. No. 11/264,418, filed Nov. 1, 2005, mailed from USPTO on Dec. 23, 2009, 24 pgs.
Office Action for U.S. Appl. No. 11/354,369, filed Feb. 14, 2006, mailed from USPTO on Jun. 26, 2008, 34 pgs.
Office Action for U.S. Appl. No. 11/354,369, filed Feb. 14, 2006, mailed from USPTO on Dec. 9, 2008, 18 pgs.
Office Action for U.S. Appl. No. 11/354,369, filed Feb. 14, 2006, mailed from USPTO on May 28, 2009, 21 pgs.
Office Action for U.S. Appl. No. 11/354,369, filed Feb. 14, 2006, mailed from USPTO on Dec. 28, 2009, 17 pgs.

* cited by examiner

METHOD AND APPARATUS FOR ENHANCED BROWSING

RELATED APPLICATIONS

This application claims priority to U.S. Provisional Patent Application No. 60/613,463, which was filed Sep. 27, 2004 and is incorporated herein by reference. This application is related to U.S. patent application Ser. Nos. 10/985,553, 10/985,628 and 10/985,700, all of which were filed Nov. 10, 2004.

FIELD OF THE INVENTION

This invention relates to the field of computer systems. More particularly, a method and apparatus are provided for improving the quality and efficiency of users' browsing experiences.

BACKGROUND

Today's browsers provide users with substandard browsing, primarily because their focus is limited to a single web page at any given time. Specifically, a browser generally displays just a single page, which may include hyperlinks to any number of other pages or sites. The browser does not allow the user to see what is on a linked page until he or she redirects the browser to that page (e.g., by selecting a hyperlink). Only then can the user determine whether the page contains anything of interest to her. If not, she must retrace her action to return to another possible branching point (e.g., by clicking a "back" button).

This pattern—of selecting a link to go to a new page, reviewing its content, and possibly selecting a link on that page—may continue any number of levels deep, all of which must be retraced to return to a starting point. When that starting point is a list of links to web sites or pages (e.g., at a search engine site) or a list of links to goods or services (e.g., at a retail site), a user may have to traverse a number of chains of linked pages, and continually return to the starting point, in the hope of finding content that more closely matches her interest.

In addition, when the user selects a link to navigate to a corresponding page, only then does the browser retrieve the content of that page. Depending on the bandwidth or type of communication link available to the user, and the status of the starting point and target site (e.g., how congested they are), there is often a noticeable time lag before the target page is fully displayed. When the user accesses numerous pages, as is typical during a search session with a search engine or retail/auction site, the combined duration of the time lags can cause a significant amount of wasted time. A user wishing to quickly review several links or pages can become very frustrated with her browser's response time. And, if an error is encountered while trying to load a page, the user may have to try reloading it multiple times before she is successful or before she gives up.

Further, users receive little assistance, if any, while navigating multiple chains of linked pages. For example, when a user browses through multiple chains from a page of search results provided by a search engine, she may come across pages that, while not fully matching her interest, may bear further examination if better pages are not found. Traditionally, she would have to remember how she reached that page (e.g., the sequence of links she selected to get there) or add a bookmark to her browser. Remembering sequences of links becomes more and more difficult as they (and her browsing session) get longer and longer. And, accumulating bookmarks that are like to be of little or no interest makes bookmark management increasing difficult.

SUMMARY

A method and apparatus are provided for enhanced browsing of electronic data (e.g., web pages, documents, electronic mail). When a first page is displayed in a browser, content identified by links to other pages is prefetched. In one embodiment, enhanced browsing windows are generated for each link's content, and possibly a set of relevant ads, but are initially kept invisible.

If the page contains multiple links (e.g., search results), an enhanced browsing stripe or column is overlaid or superimposed on the links. The stripe is transparent or semi-transparent, so that a user can identify individual links in the list. As long as a user interface cursor remains within the stripe, whenever the cursor is placed over or adjacent to a link, an enhanced browsing window containing the prefetched content for that link is displayed.

In one embodiment, the stripe or column extends at least the length of the list of links and may be aligned vertically, horizontally or non-linearly, depending on the arrangement of the links. If the cursor reaches the end of the browser window, the browser page is automatically scrolled as necessary to view additional links or page content, and the stripe is extended accordingly.

An enhanced browsing stripe or column may be displayed as soon as a first link's content is prefetched, or may be displayed when the user selects (e.g., mouses-over) a first link and a corresponding enhanced browsing window is opened.

In one embodiment, the appearance of a link whose content is being prefetched may change in appearance (e.g., color, size) after the content has been retrieved. Further, a link's appearance may change in some other manner (e.g., to a different color) if its content cannot be prefetched.

DETAILED DESCRIPTION

Figure 1:
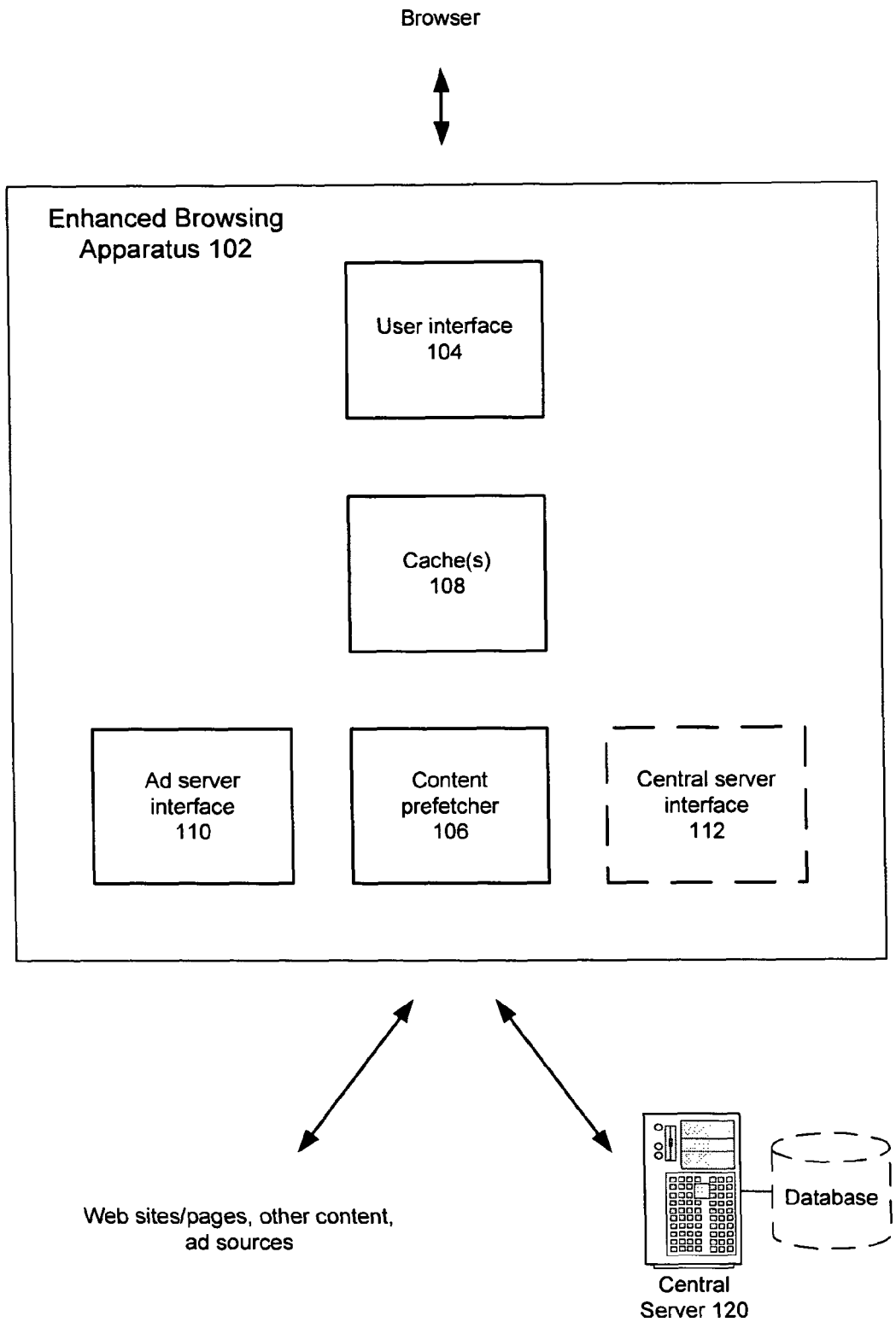
FIG. 1 is a block diagram depicting an enhanced browsing apparatus, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Introduction

In one embodiment of the invention, a method and apparatus are provided for enhanced browsing of electronic data. A user browses or navigates his browser to a first electronic page (e.g., web page, document, electronic mail message) that contains one or links or references to other pages. When he selects (e.g., mouses-over or places a cursor over) a link to a second page, an enhanced browsing window or frame containing content of the second page is displayed on top of or in front of the browser.

The enhanced browsing window contains actual content from the second page, such as HTML (HyperText Markup Language), not just an image (e.g., a gif or jpg image) of the content. The content of the second page may be prefetched before the user chooses to preview it, and so the enhanced browsing window can be displayed almost immediately when the user selects the link to the second page. The contents of the window may change as the user mouses-over other links, or separate enhanced browsing windows may be generated for each link.

For purposes of describing embodiments of the invention, a "link" that identifies or is associated with data that may be prefetched may take any form—graphical, textual or other. A link may therefore include any object or information that embodies or is accompanied by a link (e.g., a hyperlink) or reference to other electronic data or content.

The apparatus for providing enhanced browsing may include various program modules, which may be written in software using any appropriate programming language or coded in firmware. An illustrative apparatus includes a graphical user interface for presenting the enhanced browsing window and controls associated with the window, a cache for caching content for display in the window, and a fetcher or prefetcher for fetching the content. The apparatus also includes one or more interfaces to servers storing ads for display in the window and data describing users' viewing activity. One such interface couples the enhanced browsing apparatus to a central server for facilitating enhanced browsing. The apparatus may be constructed as a plug-in to an existing browser (e.g., INTERNET EXPLORER, FIREFOX), a plug-in to another application (e.g., an email application such as MICROSOFT OUTLOOK) or as a complete browser or other application.

The content of the second page displayed in an enhanced browsing window may be augmented with ads, particularly ads relevant to the content. For example, the content may be analyzed to determine a theme or nature of the second page or, if the links that are prefetched comprise a list of search results, the ads may be selected based on the search criteria that yielded the search results. In one implementation of this embodiment of the invention, ads retrieved as part of the second page's content may be replaced with different ads. In addition, content for an enhanced browsing window may be scanned for security purposes (e.g., to detect viruses, spyware, etc. Details of this enhanced browsing embodiment of the invention are provided in a following section.

In another embodiment of the invention, content of a page linked to a browsed web page (or other content) is prefetched, possibly for viewing in an enhanced browsing window. Various methods or heuristics may be applied to determine which linked pages or content to fetch or prefetch. Illustratively, when the user's browser displays a page of search results from a search engine (e.g., GOOGLE.COM, YAHOO.COM), prefetching is done automatically for some or all of the linked pages or content (e.g., web pages or sites that may have information relevant to the user's search criteria). Similarly, when the browser displays a list of links to goods or services offered for sale at a merchant or auction site (e.g., AMAZON.COM, EBAY.COM), prefetching of content may automatically begin with the linked items.

Prefetching may be initiated as soon as the browser receives or displays the main browser page. The prefetching may therefore coincide with the user's review of the page and/or the list of linked pages or other content. Thus, before the user even selects a link to content that he would like to see, that content (and/or other content) may be prefetched. Prefetched content (or content that is to be prefetched) may be scanned for viruses, spyware, adware, pornography and/or other undesired content or code.

In implementations of this embodiment of the invention, a choice of what to prefetch may be heuristically determined based on the font size of a link, the link's location on the browser page, its position within a list of links, etc. Further details of this embodiment of the invention for prefetching are provided in a following section.

In yet another embodiment of the invention, a mechanism is provided for maintaining a user's ability to enjoy an enhanced browsing experience while scrolling through a list of links (e.g., hyperlinks). In this embodiment, a graphical stripe or column overlaps or is superimposed on the list. The stripe may be arranged as (or adjacent to) a border or edge of an enhanced browsing window. The list of links may extend multiple pages or screens, and the stripe is configured to extend as the list is scrolled into view. The user may scroll through the list by sliding a user interface cursor along or within the stripe (e.g., up/down or left/right). While navigating within the stripe, content described by the links is previewed or displayed in an enhanced browsing window.

Also while navigating within the stripe, as the cursor nears the boundary of the main browser in a list that is too long to fully display within the browser, the contents of the browser are scrolled. As the cursor crosses over or is aligned with a link, content from that link is displayed in an enhanced browsing window, or a separate window may be opened and closed for each link. Thus, in this embodiment of the invention, the user can very quickly scan the content of some or all links in a list. Further details of this browsing stripe embodiment of the invention are provided in a following section.

In another embodiment of the invention, the apparatus displays a graphical depiction of a user's navigation or viewing of content (e.g., web pages, documents, electronic mail messages). The depiction may be rendered as a vertical or horizontal tree, wherein each node corresponds to one item (e.g., web page, image, document) or one set of items.

In one implementation of this embodiment, a tree root is created when the user initiates a new search (e.g., on a search engine site or at a site offering a good or service) and a page of search results is displayed in the user's browser. When the user navigates to a page linked to the current (e.g., search results) page, a new node in the tree is generated and connected to the previous node. As the user navigates deeper by selecting additional links, more and more nodes are added. To quickly move backward in his search, the user may click on a node and be taken back to the corresponding content. From there, he may choose to navigate a different path. Similarly, the user may quickly move to any other content represented in the tree by selecting the appropriate node.

The user may be able to mark a node by altering its appearance (e.g., color, size, pattern); this may facilitate the user's return to a particular page. Further details of this embodiment of the invention are provided in a following section.

Enhanced Browsing

FIG. 1 depicts an apparatus for enhanced browsing of electronic data, according to one embodiment of the invention. In the illustrated implementation, the apparatus is configured as a plug-in to a web browser such as INTERNET EXPLORER by Microsoft Corporation, FIREFOX by the Mozilla Foundation, NETSCAPE COMMUNICATOR by Netscape Communications Corporation, etc. In other implementations, the apparatus may be provided as part of a distinct application or browser, or as a plug-in or add-on to a different type of application (e.g., electronic mail, instant messaging, database).

The term "target link" may be used herein to refer to links whose content is, or should be, selected for retrieval for display in an enhanced browsing window. Similarly, the term "target content" may be used to refer to content that is or should be retrieved (e.g., prefetched).

Enhanced browsing apparatus 102 operates on any type of computing device (e.g., computer, personal digital assistant, web-enabled telephone) and comprises user interface 104, content prefetcher 106, cache(s) 108, ad server interface 110 and optional central server interface 112. The apparatus is coupled to a host browser in a manner similar to other plug-ins.

Enhanced browsing apparatus 102 is coupled to computer systems or networks containing web sites, web pages, documents, electronic mail messages and/or other electronic data or content. The apparatus may be coupled to these entities by any types of communication links, which may be shared (e.g., network) or dedicated, and wired or wireless. In particular, apparatus 102 may be coupled to a central server, which may include or be coupled to a database or other collection of data for facilitating enhanced browsing, as described below. Content accessed through enhanced browsing apparatus 102 may also, or instead, be stored on the same computing device as the apparatus.

User interface 104 is configured to build, display and manipulate an enhanced browsing window. The user interface may also provide any number and type of controls to allow a user to navigate or manipulate content within such a window, such as buttons, icons, a toolbar, etc., and may also accept keyboard input (e.g., key sequences using the CTRL or ALT keys). The various controls may allow a user to initiate or terminate prefetching of target content, open or close an enhanced browsing window, navigate his or her browser to prefetched content (e.g., by directing the browser to a page displayed in an enhanced browsing window), prefetch content linked to content displayed in an enhanced browsing window, etc.

In particular, user interface 104 may provide controls (e.g., menus) allowing the user to customize the enhanced browsing apparatus or change how it operates. User customization options may include: size or position of an enhanced browsing window, number of target links to prefetch at a time (e.g., all, ten, twenty), how to identify or prioritize target links, default action(s) to take in response to certain user activity (e.g., when the user clicks inside a window or on a link within the displayed target content), etc.

In one embodiment of the invention, user interface 104 builds an enhanced browsing window when target content is retrieved, but keeps the window invisible until and unless the user actually indicates an interest in (e.g., mouses-over) the associated target link. The window is then made visible. Invisible windows may be stored in cache(s) 108.

Content prefetcher 106 is responsible for fetching content from appropriate sources (e.g., web sites, databases, document repositories, electronic mail gateways) based on default criteria and/or a user's specified criteria. For example, content prefetcher 106 may commence prefetching target content immediately after the browser loads or displays a page containing one or more target links, thereby taking advantage of communication bandwidth that is idle while a user examines the page. Any number of links on the browser page may be treated as target links.

Content prefetcher 106 and/or some other component of enhanced browser apparatus 102 (e.g., a separate target identification module) may be configured to identify target links As described in the following section, prefetch templates may be employed to identify target links in some web pages or other content. Briefly, a prefetch template is designed for a specific page (or set of pages) and indicates where on the page a target link (or set of target links, such as a list of search results) may be found.

However target links are chosen (e.g., by the user, according to a default rule or template), they may be prioritized before the target content is retrieved. Rules for prioritizing target links are discussed below, and may be based upon the order of the links in a list of search results, their position on the page on which they appear, their font size, etc.

Depending on any priority assigned to a particular target link, the associated content is retrieved by content prefetcher 106. Upon retrieval of the target content, user interface 104 and/or some other component of apparatus 102 constructs an enhanced browsing window for the content.

It should be noted that prefetching is not required for all embodiments of the invention. Although prefetching content may speed up a user's browsing or previewing of content, other benefits of the invention may be enjoyed without content being prefetched.

Cache(s) 108 include one or more caches for storing target links, target content, prefetch templates, enhanced browsing windows, a user history (e.g., a sequence of sites browsed or previewed) and/or other data. In the embodiment of the invention depicted in FIG. 1, a cache used by enhanced browsing apparatus 102 is separate and distinct from any cache(s) maintained by the browser.

In the illustrated embodiment of the invention, when target content is displayed in an enhanced browsing window, it may be accompanied by one or more advertisements. The retrieval of ads is managed by ad server interface 110. The ad server interface interacts with any number of ad sources (e.g., advertisers, media organizations) and/or central server 120. For example, when an ad is needed, ad server interface 110 may communicate with central server 120 to determine which ad(s) to retrieve. The ad server interface may then contact the appropriate source to obtain the ad or retrieve it from the central server. The same ads may be displayed in enhanced browsing windows opened for different target links, particularly for all target links appearing on one browser page.

Ads may be content-based, to match or reflect target content within an enhanced browsing window, or may be matched to a main browser page containing the associated target link. For example, if target links on the main browser page comprise a list of search results, the search terms that yielded the search results may be used to select an ad. Thus, ad selection may be made by apparatus 102, central server 120, some other entity (e.g., an ad source) or any combination of these components.

Central server 120 maintains a database or other collection of prefetch templates, user behavior (e.g., navigation activity or patterns), prefetch or prioritization heuristics, and/or other data. In particular, the central server may collect, from users' enhanced browsing apparatuses, information regarding web pages (or other content) accessed by the users, what links in those pages were selected for browsing or previewing, the order in which they were browsed, etc.

This information may be used to help generate prefetch templates, to prioritize prefetching, and/or for other purposes. For example, by assembling such information on central server 120 from many users' enhanced browsing apparatuses, the most popular links within content viewed by those users can be determined and/or prioritized for prefetching. Some or all of this data may be replicated on, or shared with, enhanced browsing apparatus 102.

Central server 120 may also be a source of ads and content for display in an enhanced browsing window. The central server may be operated by an organization that provides enhanced browser apparatus 102 or by a different organization.

Optional central server interface 112 communicates with central server 120 to access and share data with the central server, as described above. Thus, the central server interface may forward to the central server information regarding a user's activity (e.g., sites visited, links clicked, search terms employed) and may retrieve information useful in identifying or prioritizing target links (e.g., prefetch templates, analyses of users' preferred links or content).

In other embodiments, an enhanced browsing apparatus may include more or fewer components, or the functionality of the components described above may be distributed in a different fashion. For example, an enhanced browsing apparatus may also include a component for scanning prefetched content for viruses, pornography (or other material unsuitable for certain users), spyware, adware, other malware, etc.

Further, one alternative embodiment of the invention may be implemented without prefetcher 106 or cache 108. In this embodiment, when a user browses a first page and mouses-over or hovers near a link to a second page, an enhanced browsing window may still be displayed with content from the second page, but the content may not be retrieved until the mouse-over. And, the apparatus may make use of the browser's cache or another cache already available on the user's computing device.

Figure 2:
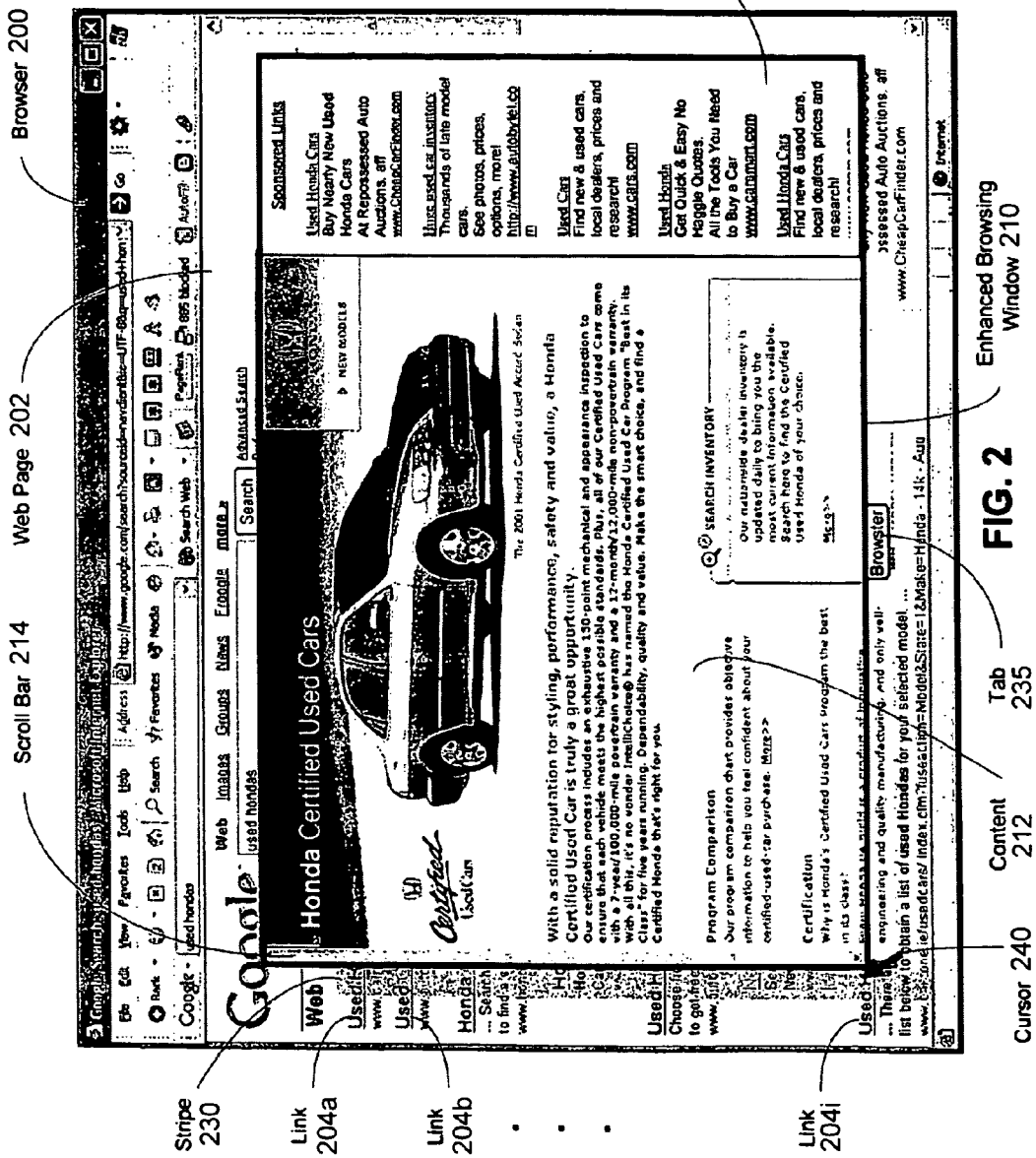
FIG. 2 depicts an enhanced browsing window, in accordance with an embodiment of the invention. (GOOGLE is a trademark of Google Incorporated. HONDA is a registered trademark of Honda Motor Company. The stylized "H" within a stylized rectangle with rounded corners and sides is a trademark of Honda Motor Company.)

FIG. 2 depicts an enhanced browsing window according to one embodiment of the invention. In FIG. 2, browser 200 (e.g., INTERNET EXPLORER by Microsoft Corporation) is open to a first page 202, which includes a list of links 204 (e.g., 204a-204i). Links 204 are search results in this example, but in other implementations may comprise any types of links, to any type of content. The content identified by or associated with links 204 may or may not be inter-related. For example, if the links comprise search results, as do links 204 in page 202, their content may be considered inter-related.

Enhanced browsing window 210 is positioned so as to allow a user to see portions of links 204. However, in other implementations, window 210 may cover links 204 to a greater or lesser degree. Alternatively, any or all of window 210 may be made fully or partially transparent, so that some or all of the content of browser page 202 is viewable even when window 210 is displayed. As described above, enhanced browsing window 210 may be constructed and cached prior to being displayed.

When a user mouses-over the link (e g, link 204i) corresponding to the content 212 of the enhanced browsing window, the window is automatically and quickly displayed. The size and/or position of window 210 may be adjustable by a user, but limits may be placed on the user's ability to re-size or re-position the window.

Ad frame 220 is also positioned within enhanced browsing window 210. The ad frame may be arranged in any position or along any edge of the window. Illustratively, ads received along with or as part of content 212 from a location identified by link 204c may be removed prior to display of the content within window 210.

Content 212 may be reduced in font size to allow it to more fully fit within window 210, and/or scroll bars (e.g., scroll bar 214) may be provided to allow a user to scroll vertically and/or horizontally. The user may be able to close window 210 by simply moving the cursor out of the enhanced browsing window (e.g., to somewhere within browser page 202). If the user clicks within window 210, page 202 of browser 200 may be replaced by the page or content displayed in the enhanced browsing window.

In one embodiment of the invention, a selectable tab or drop-down menu 230 is positioned adjacent to enhanced browsing window 210. Illustratively, clicking on tab 230 opens a menu allowing a user to customize one or more features of the enhanced browsing window or apparatus (e.g., size of window 210, how long the user must pause over a link before the window opens, degree of transparency).

In other embodiments of the invention, other user interface controls or options may be provided. For example, a set of controls may be provided to allow a user to specify how the enhanced browsing apparatus should act when the user takes certain action (e.g., clicks on or mouses-over a link within an enhanced browsing window, clicks within a window but not on a link, mouses-over a second target link while a first link's content is still being previewed).

In one implementation, buttons (e.g., "load," "prefetch content from all links") may be provided with an enhanced browsing window to allow a user to specifically request the target content or target page to be loaded into a browser, to prefetch content, or take some other action. For example, a "hold" button may allow a user to specify that the enhanced browsing window should remain open on its current content regardless of subsequent mouse movements, perhaps until the user selects a "hold off" button or clicks within the window.

Another button or control may be provided to enable a user to immediately return to the results of the latest search he or she conducted. For example, every time the user initiates a search, a "Back to Search Results" button may be configured with the URL (Uniform Resource Locator) of the search results. Then, until the user initiates a new search, he or she can select the button to return (in his or her browser or an enhanced browsing window) to the latest results.

Figure 7:
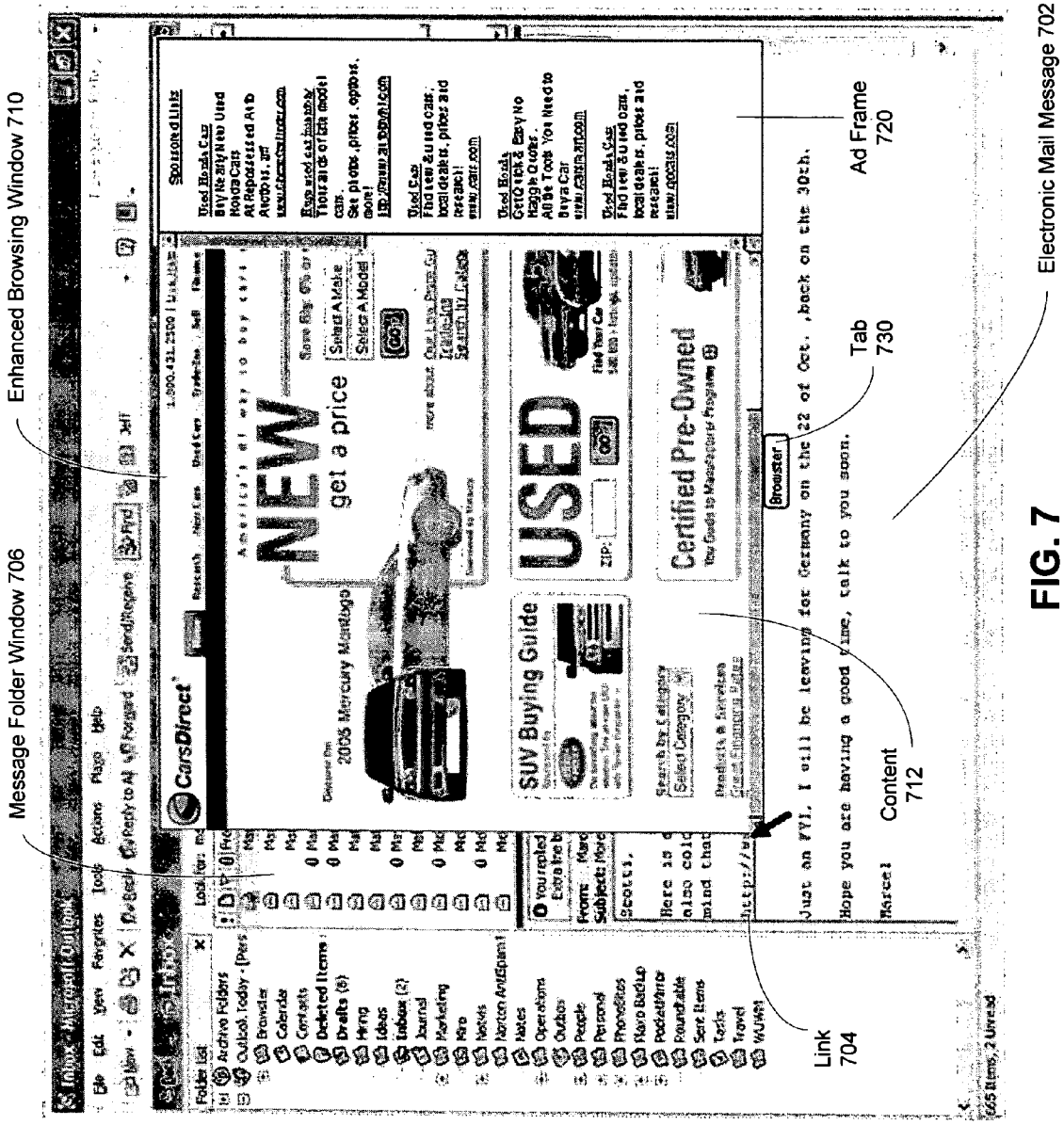
FIG. 7 depicts an enhanced browsing window, in accordance with an alternative embodiment of the invention. (OUTLOOK is a registered trademark of Microsoft Corporation. MERCURY MONTEGO is a registered trademark of Ford Motor Company.)

FIG. 7 depicts an enhanced browsing window according to another embodiment of the invention. In FIG. 7, enhanced browser window 710 is employed to preview content within an electronic mail application (e.g., MICROSOFT OUTLOOK).

In the illustrated implementation, when electronic mail message 702 is displayed, content identified by or associated with a link included in the message (e.g., link 704) may be prefetched. Thus, content 712 within enhanced browsing window 710 comprises content retrieved from a location identified by link 704. The enhanced browsing window also includes ad frame 720, which may present ads relevant to content 712 or message 702.

In another implementation, an enhanced browsing window may be employed to preview content of electronic mail messages, such as messages listed or indexed in message folder window 706.

Figure 3:
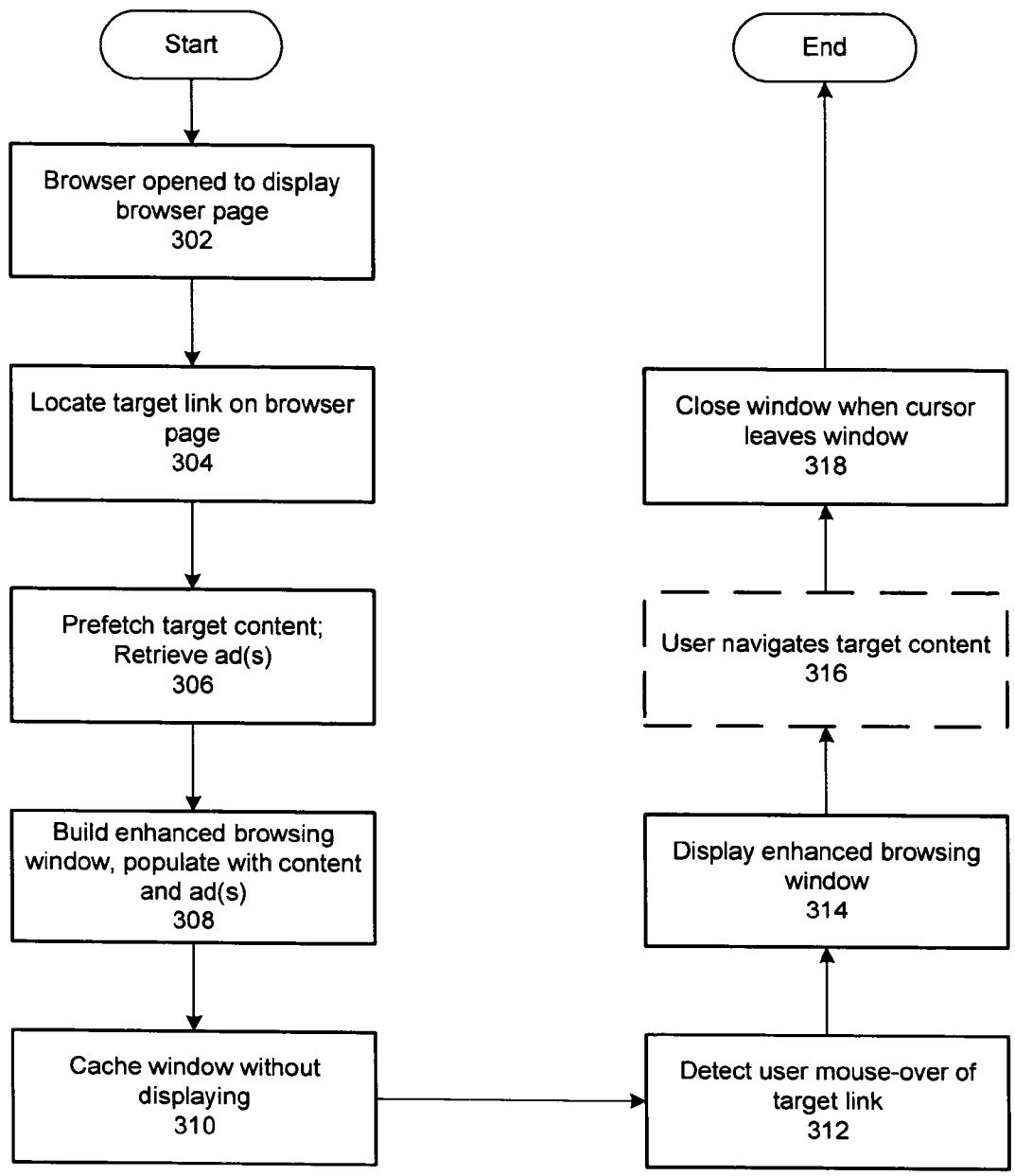
FIG. 3 is a flowchart demonstrating a method of providing enhanced browsing, in accordance with an embodiment of the invention.

FIG. 3 demonstrates a method for enhanced browsing, according to one embodiment of the invention. This method may be employed with apparatus 102 of FIG. 1 and is thus implemented on a user's client computing device, which is equipped with a browser.

In state 302, the user's browser is opened at a web page or other collection of content, which may be considered the "browser page" herein to differentiate it from another page or other target content displayed in an enhanced browsing window.

In state 304, the enhanced browsing apparatus applies default or custom rules to locate a target link on the browser page. Any number of additional target links may also be identified. For example, the apparatus may automatically locate all links on the browser page and treat them as target links. Or, the apparatus may apply a prefetch template, customized for the browser page, to identify links that are most likely to be of interest to the user.

A prefetch template may be stored (e.g., cached) within the enhanced browsing apparatus, or may be stored on a central server for retrieval by the apparatus before or when the browser page is opened. As yet another alternative, the template or other information for identifying (and/or prioritizing) target links may be retrieved from the same server that served the browser page, or may be received as part of the browser page.

In state 306, content associated with the target link is prefetched. The target content may include all or a portion of the web page, document, image or other data identified by the target link. Thus, the target content may include HTML, XML (Extensible Markup Language) or other markup language, but is not just an image of the content. As will be seen below, because the actual content is prefetched, it can be presented in a readable, understandable manner, and can be navigated (e.g., if it contains links) In particular, the prefetched content will not be presented as "thumbnails" or other non-navigable, illegible images.

One or more ads may also be retrieved, to display with the target content. As described above, the ads may be retrieved from any suitable ad source, and may be selected based on the target content, the browser page, search terms entered by the user, the user's browsing history, or other information.

In one embodiment of the invention, a target link changes appearance (e.g., color, font size, underlining, bold) to indicate when its content has been prefetched. Thus, a target link may first appear (in the browser page) in a first color (e.g., light blue), but then change to a different color (e.g., dark blue) after the target content has been fetched. In one implementation, multiple color palettes may be employed to allow link colors to be changed easily and rapidly.

Advantageously, after content for a target link is prefetched, if the user navigates the browser to that link (i.e., by clicking on it), the content can load almost immediately from the enhanced browsing apparatus' cache (or wherever else it was stored). Thus, the user's browsing experience is enhanced even without using an enhanced browsing window to preview content.

In state 308, an enhanced browsing window is constructed and populated with the target content and any ads that were retrieved to accompany the content. The content may be resized or may retain its full size, in which case scroll bars may be provided for scrolling vertically and/or horizontally. In different implementations of this embodiment of the invention, ads that were received as part of the target content may be retained, excised or replaced.

In one implementation, when target content from multiple target links is prefetched, enhanced browser windows may be generated (but not displayed) for any number of the links. Thus, if content is prefetched for fifty target links, enhanced browsing windows may initially be generated for any number of the target links, from zero to fifty. Windows may be generated for the remainder later (e.g., after the user starts previewing content).

In state 310, the window is cached without being displayed. By constructing the window before it needs to be displayed, the enhanced browsing window can be presented almost instantly when the user indicates an interest in the target link. In the method of FIG. 3, a separate enhanced browsing window is constructed and cached for each target link whose content was prefetched. Thus, states 304 through 310 may be repeated for any number of target links.

In state 312, the enhanced browsing apparatus detects a user mouse-over or other selection of the target link. When a user interface cursor (e.g., mouse cursor, a cursor or selector controlled by the TAB key) appears over or adjacent to the target link, a predetermined period of time (e.g., one second) may be required to pass before the window containing the target content will be switched to visible status. This time period may be adjustable by the user. Illustratively, if the user employs a keyboard for input (e.g., instead of a mouse), selection of the target link may be identified by the user's tabbing to the link and pausing for the necessary time period.

In state 314, when it is determined that the user has moused-over or otherwise selected or expressed an interest in the target link, the enhanced browsing window is made visible. In one implementation, the window is approximately 75% of the size of the user's browser, and may be positioned adjacent to (or overlapping) the target link or a list of links that includes the target link. The screen cursor may be positioned within the enhanced browsing window, near (or over) the target link.

In optional state 316, enhanced browsing may be extended to the target content so that the user can navigate the content or the enhanced browsing window. That is, one or more links within the target content may be treated as target links, in which case their associated content is prefetched. Then, if the user mouses-over a target link in the target content, another enhanced browsing window may be created to display the new target content. Or, the target content of the enhanced browsing window may be replaced with the new target content.

Illustratively, if the user clicks on the target link associated with the target content, or left-clicks (i.e., clicks the primary mouse button) within the target content (but not on a link), the browser page may be replaced by the target content or the page containing the target content. The same action may be taken if the user leaves the cursor within the enhanced browsing window for a predetermined period of time (e.g., 5 seconds). If the user clicks on a link within the target content, the linked content may replace the target content within the enhanced browsing window or the user's browser may be directed to that content or page.

In state 318, if the user moves the cursor out of the enhanced browsing window, it may close because it may be assumed that the user is no longer interested in viewing the target content. Or, right-clicking (clicking a mouse button other than the primary button) within the window (e.g., but not on a link) may cause it to close.

If the user moves the cursor from the window to a second target link, the window may disappear and be replaced with the enhanced browsing window constructed for the second target content (or the target content may be replaced by the second target content).

As one skilled in the art will recognize, the enhanced browsing experience described herein differs significantly from a traditional "pop-up" within a web page. Traditional pop-ups, when selected, merely display information that was received with or as part of the web page. In contrast, an enhanced browsing window displays content from a different page or source, and that content may be navigable. In one implementation, the enhanced browsing apparatus may be configured to suppress traditional pop-ups.

The illustrated method ends after state 318.

In one implementation of this embodiment of the invention, as a user mouses-over different target links and new enhanced browsing windows are opened, the same or similar ads may accompany each set of target content. The ads may change, however, if the user directs her browser to a different page, initiates a new search (with new search terms) in the browser page, or doesn't click on any of the ads. In the latter case, if a set of ads is presented a number of times and the user expresses no interest in them, another examination may be performed of the user's latest search criteria and/or the content of pages she has chosen to view, and a new set of ads may be selected for placement in an enhanced browsing window.

In another implementation of this embodiment of the invention, a user's enhanced browsing apparatus or windows may be branded or customized by an organization that provides the enhanced browsing apparatus (e.g., a favored web site) or by some other organization. In this case, an enhanced browsing window may be constructed with the provider's logo, with a link to the provider, with ads sponsored by the provider, etc.

In yet another implementation, the enhanced browsing apparatus is installed and operated at a central server. In this implementation a user navigates to the server to engage and employ the apparatus. This implementation may be well suited for thin clients.

Prefetching Target Content

In one embodiment of the invention, methods are provided for identifying and/or prioritizing target links for retrieval of associated target content. The links may be identified within a web page or other browsable object (e.g., document, image, electronic mail message). Content from any number of links on the page (i.e., zero or more) may be retrieved.

As described in the preceding section, prefetching of content may be done in a default manner, or may be based on user-specified criteria and/or criteria customized for a particular web page or site. Thus, content from links that are more popular or more likely to be selected by a user may be prefetched before (or instead of) content from links less likely to be selected by the user.

In one implementation of this embodiment of the invention, a prefetch template may be used to identify a set of links on a page. A prefetch template may be designed for a specific web page or site, to identify target links (or recommended target links) by their location or position on the page. For example, lists of search results (e.g., from a search engine or merchant web site) may be located in various locations on different pages (e.g., in a single column on the left or right hand side of a page, in a two-column table), and prefetch templates for those pages would be designed accordingly.

Content described by links other than those identified by a prefetch template may also be prefetched, but the target links identified by the prefetch template may be awarded higher priority. Illustratively, the default order of prefetching target content may match the order in which their links are posted on the page (or in a list of search results), or content for some or all target links may be prefetched simultaneously (e.g., in parallel)

Enhanced browsing apparatuses may maintain (or even generate) prefetch templates, or may retrieve them from a central server or other source. Thus, when a particular page is loaded into a browser, an enhanced browsing apparatus operating with the browser may quickly retrieve a prefetch template from the central server.

In another implementation, a prefetch template for a web page (or other content) may comprise a list of target links on that page. The list may be prioritized, and may be derived by observing any number of users' selection of links while browsing or viewing the page. Thus, a central server may collect data regarding multiple users' browsing activity (e.g., pages visited, links selected), and distill the data to identify and/or prioritize links on web pages those users' visited.

In other implementations of this embodiment of the invention, all links on a page may be treated as target links by default, or all links within a list of search results. Content from any number of target links may be prefetched in any order and/or in parallel with other links' content. Yet further, a link retrieved as part of the content associated with a target link may also be treated as a target link, in which case content that is multiple pages or multiple links removed from the current page (the current page to which a browser is open) may be prefetched without leaving the current page.

In yet other implementations, heuristics may be used to help identify and/or prioritize target links, in addition to or instead of using a prefetch template (e.g., for a page for which no prefetch template is available). For example, a set of heuristics may specify that links having certain characteristics or meeting certain criteria should be target links, or that target links should be prioritized based on those characteristics or criteria. Illustrative characteristics include: the region of a page in which a link is located (e.g., center, top, left side), font size, link color, the number of links to the same content (e.g., the more links there are to a particular page of content, the higher priority it should receive), a link's proximity to an image or other notable content, etc.

In another implementation of this embodiment a user may be able to select or de-select target links for prefetching. For example, the user may be able to enter one particular key sequence (e.g., ALT-B) or select one particular control or button within a user interface to instruct a content prefetcher to target one certain link, or all links, on a page, or some other key sequence (e.g., ALT-N) or control to prevent the apparatus from targeting a certain link or any links.

A user may be able to train an enhanced browsing apparatus to identify target links For example, the user may be able to select desired target links on a page (e.g., by drawing a box around them, by mousing-over or clicking on them), after which the apparatus memorizes the links for automatic identification the next time the user visits the page. Illustratively, to train the apparatus the user may first initiate a training mode (e.g., by activating a particular user interface control), then select the target links and disengage the training mode.

In one implementation, a user may be able to construct or customize a prefetch template, which may be useful if the user often visits a page for which the enhanced browsing apparatus does not have a template. A user interface for the apparatus may provide controls allowing the user to construct the template by identifying locations of target links in the page, by specifying that all links are target links, by selecting individual links as target links, choosing characteristics for selecting target links, etc.

As described above, an enhanced browsing apparatus may collect a user's browsing or previewing (i.e., enhanced browsing) activity to help identify target links. Thus, if the user frequently selects or navigates to links arrayed along the right side of pages at a particular site, upon a subsequent visit to that site the user's enhanced browsing apparatus may automatically treat such links as target links and prefetch their associated content. Similarly, if the user selects links in a set of links in a particular order (e.g., top to bottom, bottom to top, left to right), the enhanced browsing apparatus may prioritize prefetching of the links' content accordingly.

Data accumulated by the apparatus may be shared with a central server in order to accumulate and analyze data for multiple users, which may then be distributed to their (and/or other users') enhanced browsing apparatuses to help identify or prioritize target links. For example, based on activity data collected from users who visited a particular web site, the central server may identify certain links (or links in a certain location of a page at that site) as being most popular. That information may be shared with users' apparatuses to make those links target links. In one implementation, however, users may be provided with an option to not share information regarding their browsing activity.

Thus, a centralized database for identifying and/or prioritizing target links may be maintained. Individual enhanced browsing apparatuses may receive data from the database on periodic intervals, when a browser is opened (or opened to a particular page), or on some other schedule. For example, when a browser is directed to a particular page, the database may be accessed to retrieve pertinent data.

In addition to, or instead of, collecting at a central database data regarding users' activity (e.g., what sites they visited, what links they clicked on), similar data may be retrieved from web sites. This information may indicate which pages/links were most often selected by the web sites' visitors, the most popular order in which they were selected, etc. This information may be retrieved by a central server or by a user's enhanced browsing apparatus.

In one method of prefetching, links may be chosen as target links, or target links may be prioritized for prefetching, based on a point system. For example, from information accumulated by the enhanced browsing apparatus or a central server, links on a web page may be assigned points based on their popularity (e.g., how often they were selected). Points may also be awarded based on heuristics (e.g., font size, location of a link within a page). The more points awarded to a link, the more likely it is treated as a target link and/or the higher priority it will receive for prefetching.

Prefetching is not limited to links present or visible in a single page. For example, a page displayed in a browser may be too long to view at once, and so some links on that page may be off-screen. Further, and as can be seen with search result listings, a list of links may span multiple pages, with each page linked to the next (e.g., using "previous" and "next" buttons). Therefore, in one method of prefetching content for enhanced browsing, links may be target links even if they are off-screen or on a page linked to the current page. In general, any number of pages that continue or are forward-linked to a current page (e.g., by "next" buttons) may be prefetched, and/or links appearing on those pages.

In addition, when a web page or other content that contains links is prefetched or displayed in an enhanced browsing window, those links may be treated as target links. Thus, a user may use the enhanced browsing window to quickly navigate several levels or links away from the page to which his or her browser is currently opened.

In one method of prefetching, when target content cannot be retrieved, the target link's appearance may be altered. For example, the link may be changed to a different color (e.g., gray, yellow) to alert a user that the link is not functional. Prefetching may fail because a target link is broken or a "page not found" error is received, a necessary certificate or other security token is not available, or for various other reasons.

In one implementation of this embodiment of the invention, prefetched content, or content to be prefetched, is scanned for viruses, malware (e.g., spyware, adware), obscene or pornographic material, etc.

Figure 4:
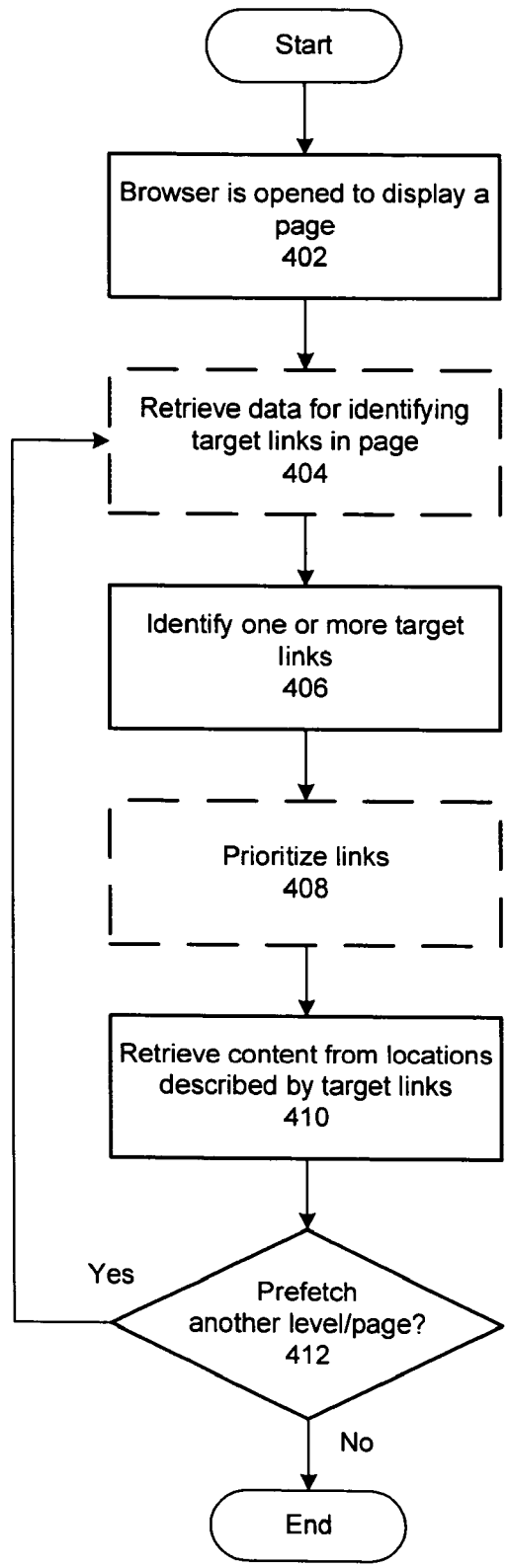
FIG. 4 is a flowchart demonstrating a method of prefetching target content, in accordance with an embodiment of the present invention.

FIG. 4 demonstrates a method of prefetching electronic data or content, according to one embodiment of the invention. As described above, prefetching may be performed in many different ways in other embodiments.

In state 402, a user's browser is opened at a web page or other electronic content (e.g., document, image, electronic mail message), which may be considered the "browser page" herein to differentiate it from a page or other target content displayed in an enhanced browsing window.

In state 404, a set of data for identifying target links in the browser page may be retrieved from local or remote storage (e.g., from a central server). The data may include a prefetch template, a list of specific links, heuristics, etc.

In state 406, one or more target links are selected in a default manner (e.g., all links on the page) and/or using data retrieved in state 404. For example, if the page contains a relatively small number of links (e.g., five, ten), they may all be considered target links (and prefetching may begin immediately) without waiting for data designed to facilitate the identification of target links. Some or all of the links are to pages or sites different from the browser page, and therefore will require prefetching of content from different locations than the browser page was received from.

In state 408, the target links may be prioritized. For example, data for prioritizing target links may be retrieved separately or in conjunction with data for identifying target links. Data for prioritizing target links may include information regarding the relative popularities of links on the page (e.g., from a central server, from the web site that provided the browser page), a recommended order of priority, heuristics, etc.

In state 410, the target content is prefetched. If the target links were prioritized, their content may be prefetched in priority order. Additionally, content from multiple target links may be retrieved in parallel. The number of prefetch operations performed in parallel may depend upon the available communication bandwidth. For example, if the user has a broadband connection, more prefetches may be done in parallel than if the user has a dial-up connection.

Illustratively, the prefetched content may include the full content described by a target link or located at the specified location (e.g., URL or Uniform Resource Locator). Or, some of the content located at or retrieved from that location (e.g., an ad, an image) may be discarded.

In state 412, it is determined whether prefetching should proceed to the next level (i.e., to links within prefetched content) or another page. If so, another page is selected, such as a page retrieved as target content in state 410, and the method returns to state 404. Otherwise, the method ends.

State 412 may be applied sometime after target content is retrieved. For example, after content is retrieved in state 410, it may be cached until a user chooses to preview it in an enhanced browsing window. When this occurs, the method of FIG. 4 may be applied to the page or content being previewed.

In another method of prefetching, identification of target links and/or prioritization of target links for prefetching may be dynamic, and depend upon a user's enhanced browsing activity. For example, if a user selects for previewing a first link in a particular position on a web page, it may be assumed that he or she will also want to preview content from links close to the first link. Thus, some prediction may be made to what content a viewer may wish to preview.

In yet another implementation of this embodiment of the invention, content may be prefetched from a pay-per-click or pay-for-performance ad (e.g., a textual ad, a banner, an image) without the prefetching counting as a "click." In particular, an ad or other type of content may register each user "click through" (or selection) of the ad, with each click through generating revenue to an entity that presented the ad.

In this implementation, content from the ad is prefetched like other content, but no "click through" is registered until the user actually selects the ad for browsing (or, in one alternative implementation, until he mouses-over the ad). Illustratively, when the ad content is prefetched, the URL (Universal Resource Locator) or XML code used for the prefetching may include a tag, keyword or other indicator that the ad content is not being retrieved as part of a click through. When the user selects the link (i.e., generates a click through), then a normal "click through" of the ad may be initiated. This helps ensure that the ad revenue is correctly apportioned. However, the content may be served from the prefetched version rather than awaiting the newly requested copy.

Enhanced Browsing Stripe

In one embodiment of the invention, an enhanced browsing stripe or column is provided for facilitating enhanced browsing of target content identified by multiple links in a page. For example, when a list of search result links (e.g., from a search engine, from a merchant or auction site) is displayed in a browser, the enhanced browsing stripe may be overlaid or superimposed on the list.

A user interface cursor may then be moved within the stripe and, as the cursor passes over or adjacent to a link, an enhanced browsing window may be opened to display the target content. Ox, if an enhanced browsing window is already open, the displayed target content may change as the cursor reaches different links.

In different implementations, an enhanced browsing stripe or column may be horizontal, vertical, diagonal or even non-linear, so as to overlay or remain close to links in a browser page. A stripe may be of any thickness (e.g., one quarter inch, one centimeter), and may be transparent or semi-transparent (e.g., light gray) so as to allow a user to read or identify a link underneath the stripe.

When a list of links is first presented (e.g., in a browser page), the stripe may or may not be automatically applied: If not, when a user mouses-over or selects a first target link in a list and an enhanced browsing window is displayed with the corresponding target content, the stripe may be presented at that time. The stripe may therefore appear adjacent to an enhanced browsing window or as one edge or border of the window.

In FIG. 2, stripe 230 is placed adjacent to the left edge of enhanced browsing window 210, but only extends over the list of links 204, not the full length of the window. The stripe may extend the full length of the window in other implementations. As can be seen in FIG. 2, stripe 230 extends below the bottom edge of window 210, so that it appears over all links 204.

In one implementation, when an enhanced browsing window is opened and an enhanced browsing stripe displayed, a user interface cursor (e.g., mouse cursor 240 in FIG. 2) may be moved to a position within the stripe and on top of or near the target link whose content is displayed within the window. This may make it easier for a user to quickly preview content from other links, by moving the cursor within the stripe to those links. The stripe may be closed or removed if the cursor is moved (or clicked) outside of the stripe and an open enhanced browsing window. Alternatively, the cursor may be initially placed within the enhanced browsing window.

If the cursor is moved within the stripe to one end of the stripe, and the list of links associated with the stripe extends past that end, off the display device (e.g., to another page or screen), the web page or other content containing the list of links may be automatically scrolled to reveal additional links. The stripe will automatically extend as the content is scrolled, for as long as additional links appear. Alternatively, a stripe may extend even beyond the list of links, to allow a user to continue scrolling the web page (e.g., to the end of the page). If an enhanced browsing window is open when the web page is scrolled, the window may remain in the same location of the display device as scrolling continues.

An enhanced browsing stripe may be generated and maintained by a user interface or other component of an enhanced browsing apparatus.

Figure 5:
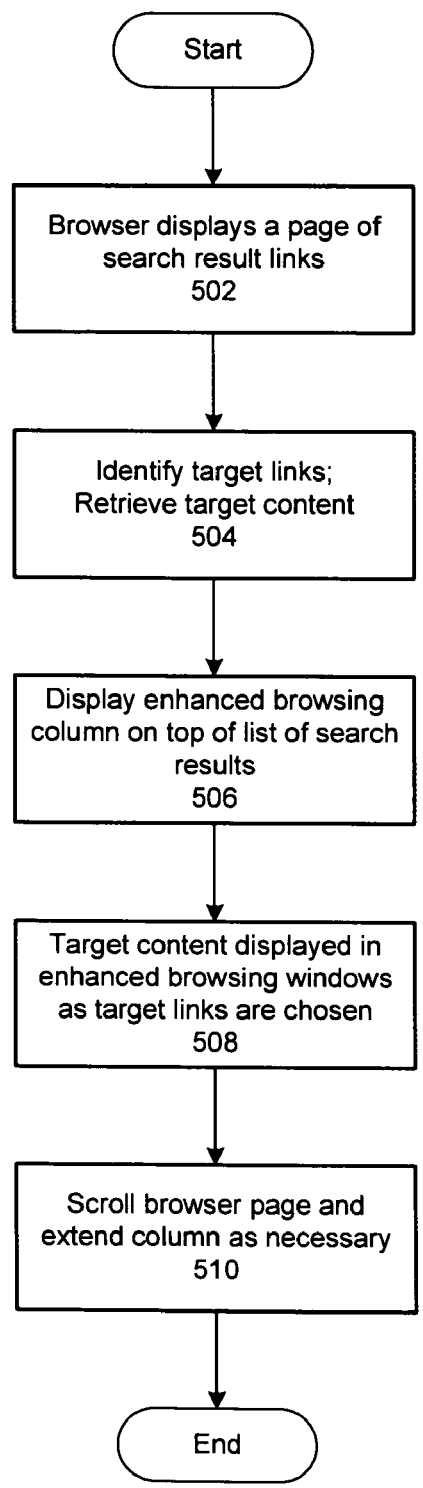
FIG. 5 depicts a method of using an enhanced browsing column or stripe, in accordance with an embodiment of the present invention.

FIG. 5 demonstrates a method of using an enhanced browsing stripe or column to facilitate enhanced browsing, according to one embodiment of the invention.

In state 502, a user's browser is opened at a web page or other electronic content (e.g., document, image, electronic mail message) that contains a list of search result links. The web page may be considered the "browser page" herein to differentiate it from a page or other target content displayed in an enhanced browsing window.

In state 504, target links are identified, including some or all of the search result links. Any or all links may be identified by default, a prefetch template may be applied, a list of most popular links may be used, etc. The links may be prioritized, and content identified by some or all target links is retrieved.

Enhanced browsing windows may be constructed (but not yet displayed) for target content for some or all of the target links. Illustratively, all target content is retrieved, but not necessarily all at the same time (i.e., in parallel).

In state 506, an enhanced browsing stripe is displayed on top of the list of search results. The stripe may be displayed as soon as one or more target links' content is retrieved, may be displayed when a first enhanced browsing window is displayed, or may be displayed as soon as the target links are identified.

In state 508, as the user moves a user interface cursor over target links, but within the enhanced browsing stripe, target content for the links is displayed in one or more enhanced browsing windows. For example, a first window may be opened when the user mouses-over a first target link. That window may remain open while the user moves the cursor, and other links' content may replace the first link's content in the window. Alternatively, an enhanced browsing window may open when the user mouses-over a target link, and then close when the cursor leaves the link.

In state 510, if the cursor is moved to the edge of the browser window and the list of search results extends to another page or screen, the browser page will be scrolled as needed (e.g., upward, to the left) to bring other links onscreen. The enhanced browsing stripe will extend or elongate as the page scrolls. After state 510, the method ends.

Graphical History Navigation Tree for Searching/Browsing

In one embodiment of the invention, a method and apparatus are provided for facilitating a user's navigation or browsing of search results or some other collection of interrelated links to electronic data. In one implementation of this embodiment, a graphical history navigation tree is rendered, wherein each node corresponds to a different web page or other set of data (e.g., documents, images, electronic mail messages).

The tree may be displayed anywhere within the user's display screen, such as within a window placed immediately below an enhanced browsing window (or immediately below a location at which an enhanced browsing window may be opened), along the left or right side of the display screen, etc. Within its window, a history navigation tree may start with a root representing a new set of search results or a new browsing session, and thereafter grow in any direction (e.g., from left to right, from top to bottom). A new tree root may be placed when a new search is initiated, when a new browser window is opened, or anytime a user requests a new tree be started.

Execution of a new search may be detected by monitoring the web site or page a user is browsing. Initiation of a new browsing session may be assumed when a browser is opened. If the site the user is browsing employs a search engine and the user engages the engine, a root of a new history navigation tree may be placed at that time. Any previous history navigation trees may still appear in the same window, but may be scrolled off-screen as the current tree grows.

In one embodiment, each time the user navigates (e.g., in the browser) to or previews (e.g., in an enhanced browsing window) one of the search result listings (or some other top-level link within the page being browsed), a new child node is added to the current tree and connected to the root. As the user continues to navigate or preview linked content, yet more nodes are added and linked to the history navigation tree. Thus, for each page, site or other collection of content the user accesses, another node is added to the tree.

Thereafter, the user can quickly navigate to or preview content previously visited by selecting the appropriate node. Illustratively, if the user clicks (e.g., left-clicks) on a node, the user's browser is opened to the corresponding content. If the user mouses-over a node (e.g., for a predetermined period of time) or rightclicks on the node, the corresponding content may be opened for previewing in an enhanced browsing window.

Thus, an enhanced browsing apparatus's cache may store content corresponding to any number of nodes in the current history navigation tree, and/or previous trees. Alternatively, the content may be retrieved from the target page or site at the time the user clicks on or mouses-over a node.

When the user clicks on or mouses-over a node corresponding to a particular web domain or site, a list of links visited at that domain may be displayed. Thus, a node may represent a collection of web pages or content, not just a single document.

A user may be permitted to alter the appearance of a node. For example, if the user decides that a particular page warrants a closer examination if nothing more interesting or helpful is found, he may choose to change the node's color, size or other characteristic (e.g., make it blink, animate it) to mark it. One particular marking may be applied to identify the node corresponding to content the user is currently browsing or previewing.

Similarly, the user may be able to notate a node and/or search (e.g., to name the search) by selecting it (e.g., right-clicking) and entering his notes into a file that will be saved with the tree.

As described above, a new search/browsing history navigation tree may be started for each new search. However, when a user merely modifies the search terms of a current (or previous) search, this may simply result in a new branch being added to the current (or previous) tree.

A search/browsing history navigation tree may be generated and maintained by a user interface or other component of an enhanced browsing apparatus.

Figure 6:
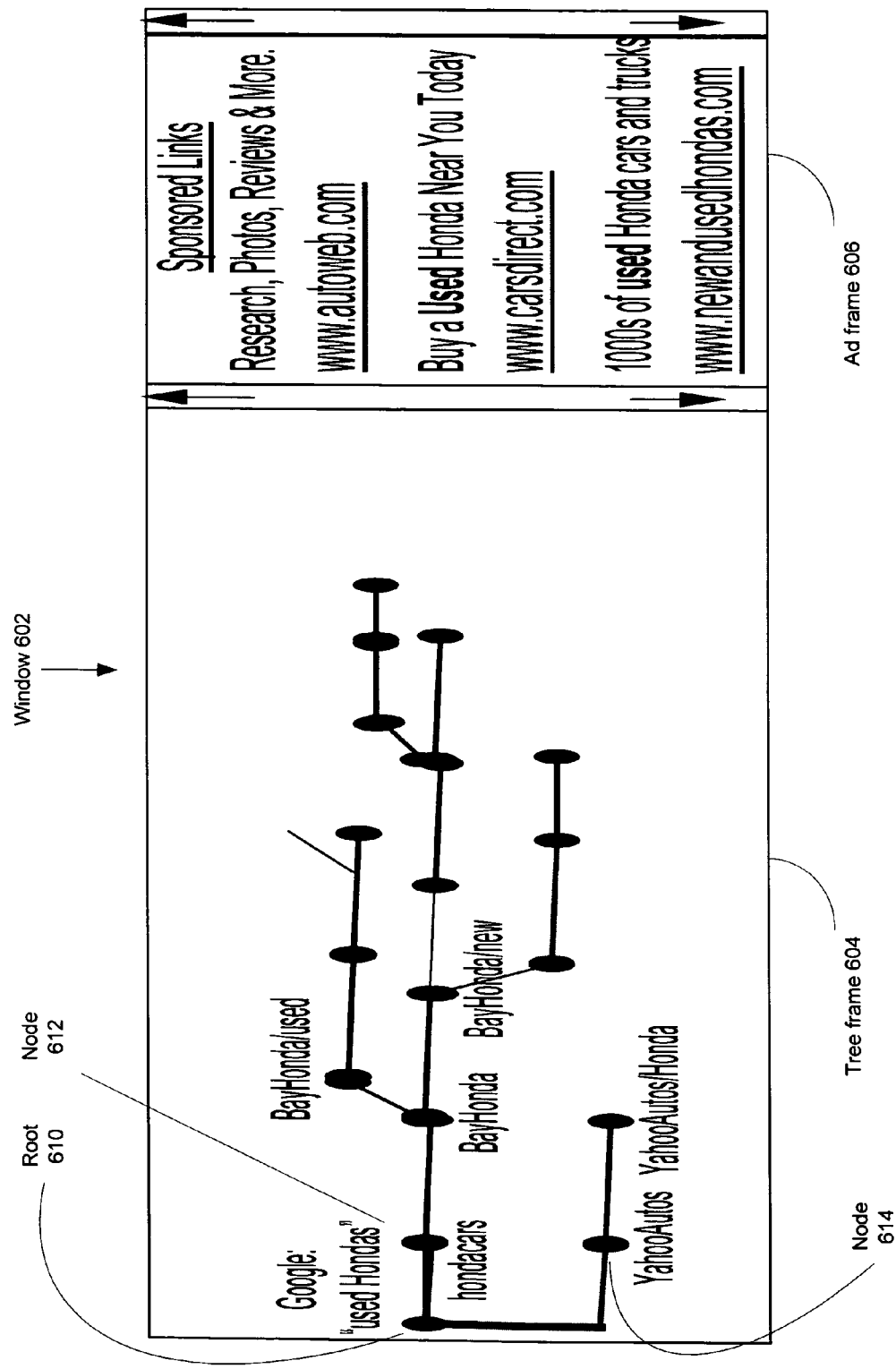
FIG. 6 illustrates a navigation tree for facilitating a user's navigation of content that was browsed or searched, in accordance with an embodiment of the invention.

FIG. 6 depicts a search/browsing history navigation tree, according to one embodiment of the invention. Program code for generating such a tree may be implemented as a plug-in to an existing browser, In FIG. 6, window 602 tree frame 604 and ad frame 606. The horizontal nature of window 602 makes the window suited for placement above or below an enhanced browsing window. In other embodiments, window 602 may be oriented vertically.

The history navigation tree displayed in tree frame 604 begins with root 610, which, in this example, corresponds to a search for a used Honda automobile. This search may have returned any number of links to relevant content. Among those links, the user has so far browsed or previewed web pages or sites identified by two top-level links, corresponding to nodes 612, 614.

As the user visited or previewed content linked to those pages, additional nodes were added to represent that content. As shown in FIG. 6, any number of nodes may be notated. Such notations may be automatically extracted from HTML of the corresponding content, or may be specified by the user. Logos of organizations associated with a node's content may be displayed in addition to (or instead of) descriptive text.

Window 602 is expanded in FIG. 6 to allow for closer inspection. In different implementations of this embodiment of the invention, the window may be relatively narrow in height (when aligned horizontally) or width (when aligned vertically), on the order of 0.5 inches to 1.5 inches.

The visual history navigation tree allows a user to easily track his navigation and quickly jump from one node's content to another's. Because window 602 may remain open even after the user navigates away from the search results, he can quickly and easily return. Window 602 may include standard controls (e.g., buttons) to close, expand, minimize or otherwise manipulate the window.

Because a history navigation tree may be saved (e.g., to disk), the user may open a history navigation tree window (e.g., using the normal browser drop-down menus), which may be automatically populated with the most recent tree.

Ads displayed in ad frame 606 may include ads relevant to the search associated with the tree in tree frame 604, ads relevant to the specific node the user is at, pay-per-click sponsored ads, etc. Either or both of tree frame 604 and ad frame 606 may include scroll bars (horizontal and/or vertical).

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of facilitating enhanced browsing of electronic content, the method comprising:
   identifying within a first page of browsed electronic content a plurality of links to other pages of electronic content, including a first link to a second page;
   displaying a visible overlay region overlaying the first page of electronic content within a first window of a browser application, the visible overlay region partially overlaying three or more of the identified links displayed in the first window, wherein portions of the identified links overlaid by said visible overlay region are visible therethrough, and wherein the three or more identified links are displayed on different respective lines within the first window; and
   initiating display of a browsing window containing electronic content from the second page, wherein said initiating display of the browsing window comprising content from the second page occurs in response to detecting placement of a cursor within said visible overlay region and in proximity to the first link, and wherein said initiating display of the browsing window does not occur when the cursor is in proximity to the first link and outside the visible overlay region.

2. The method of claim 1, wherein the three or more links comprise a list of search results.

3. The method of claim 1, further comprising:
   automatically extending said visible overlay region as the first page is scrolled within the first window of the browser application, so that said three or more links remain overlaid by the visible overlay region.

4. The method of claim 1, further comprising:
   detecting placement of the cursor within said visible overlay region and near an end of said visible overlay region; and
   automatically scrolling the first page within the first window.

5. The method of claim 4, further comprising:
   automatically extending said visible overlay region as the first page is scrolled.

6. The method of claim 1, further comprising, prior to said detecting:
   constructing, without displaying, the browsing window containing the electronic content from the second page.

7. The method of claim 1, further comprising, prior to said detecting:
   for each of the identified plurality of links, including the first link, prefetching content from a page of electronic content identified by the link.

8. The method of claim 7, further comprising, after said prefetching of the electronic content from the second page:
   altering an appearance of the first link.

9. The method of claim 1, further comprising:
   automatically closing the browsing window when the cursor is moved from a position inside the browsing window to a position outside the browsing window and outside said visible overlay region.

10. The method of claim 1, further comprising, prior to said initiating display of the browsing window:
    caching the browsing window in a cache distinct from a cache that is used by the browser application to store pages that have previously been visited by the browser application.

11. The method of claim 1, wherein the electronic content of the second page is navigable content including one or more hyperlinks.

12. The method of claim 1, wherein the electronic content of the second page includes HTML (HyperText Markup Language).

13. A computer-readable storage medium storing computing-device executable instructions configured to cause a computing device to perform a method, comprising:
    identifying within a first page of electronic content displayed within a first window a plurality of links to other pages of electronic content;
    displaying a non-opaque, visible overlay region within the first window, wherein the visible overlay region partially overlays three or more of the plurality of identified links, wherein the three or more identified links are displayed on different respective lines within the first window; and
    initiating display of a preview window containing content from a page targeted by a first of said three or more links overlaid by the non-opaque, visible overlay region in response to detecting placement of a cursor within the visible overlay region and within a vicinity of the first link, wherein said displaying of the preview window does not occur when the cursor is determined to have been placed within the vicinity of the first link and outside the visible overlay region.

14. The storage medium of claim 13, wherein the first page is larger than the first window, and wherein the method further comprises extending said visible overlay region as the first page is scrolled within the first window.

15. The storage medium of claim 14, wherein said visible overlay region is extended to remain partially overlaid on said three or more links.

16. The storage medium of claim 13, wherein said visible overlay region is aligned adjacent to one edge of said preview window.

17. The storage medium of claim 13, wherein said vicinity of the first link includes an area covered by the first link in the first window.

18. The storage medium of claim 13, wherein the method further comprises removing said preview window in response to determining that the cursor is placed outside said visible overlay region and outside said preview window.

19. The storage medium of claim 13, wherein the method further comprises stopping display of said preview window in response to determining that the cursor has been moved away from said vicinity of the first link.

20. The storage medium of claim 13, wherein the method further comprises automatically scrolling the first page within the first window when the cursor is placed within said visible overlay region and near an end of said visible overlay region.

21. The storage medium of claim 20, wherein the method further comprises automatically extending the visible overlay region as the first page is automatically scrolled within the first window.

22. A computer system comprising:
a processor; and
memory storing program instructions, wherein the program instructions are executable by the computer system, the memory comprising instructions to:
identify within a first page of electronic data a plurality of links to other pages of electronic data;
prefetch content from a second page of electronic data linked to a first one of the identified links while a browser application displays in a first window the first page of electronic data;
display a non-occluding visible overlay region within the first window so that three or more of the identified links are partially overlaid by at least one of the one or more non-occluding visible overlay regions, wherein the three or more identified links are displayed on different respective lines within the first window; and
initiate display of a browsing window including at least a portion of said prefetched content, wherein said displaying of the browsing window occurs in response to determining that a cursor has been placed within one of said visible overlay regions and in proximity to the first link, but does not occur while the cursor is in proximity to the first link and outside the one or more visible overlay region.

23. The computer system of claim 22, wherein the memory includes a first cache configured to cache one or more of:
said prefetched content; and
said browsing window.

24. The computer system of claim 23, wherein said first cache is separate from a second cache used by the browser application to cache pages that have previously been navigated to.

25. The computer system of claim 22, wherein the memory further comprises instructions to:
retrieve a set of ads for display with said at least a portion of the prefetched content within said browsing window.

26. The computer system of claim 22, wherein the memory further comprises instructions to:
alter an appearance of the first link.

27. The computer system of claim 26, wherein the memory further comprises instructions to:
alter the appearance of the first link after said content is prefetched.

28. The computer system of claim 26, wherein the memory further comprises instructions to:
alter the appearance of the first link if the content from the second page cannot be prefetched.

29. The computer system of claim 22, wherein said prefetched content comprises markup language.

30. The computer system of claim 22, wherein the memory further comprises instructions to:
construct the browsing window, including said at least a portion of said prefetched content, in response to said prefetching said content and independent of placement of said cursor in the first window.

31. The computer system of claim 22, wherein the cursor is in proximity to the first link at least when the cursor is on the first link.

32. The computer system of claim 31, wherein the cursor is in proximity to the first link also when the cursor is adjacent to the first link.

33. The computer system of claim 22, wherein the browser application is navigable to locations at which electronic data are stored, wherein said displaying of the browsing window is achieved without navigating the browser application to the second page.

34. The method of claim 1, wherein the visible overlay region is a stripe.

35. The method of claim 1, wherein said identifying, said displaying the visible overlay region, and said initiating display of said browsing window are performed by a plug-in to a browser application.

36. The storage medium of claim 13, wherein the visible overlay region is a stripe.

37. The computer system of claim 22, wherein the visible overlay region is a stripe.

38. The method of claim 1, wherein detecting placement of the cursor within said visible overlay region and in proximity to the first link is performed independent of a selection using the cursor.

39. The storage medium of claim 13, wherein determining that the cursor has been placed within the visible overlay region and within a vicinity of the first link is performed independent of a selection using the cursor.

40. The computer system of claim 22, wherein determining that the cursor has been placed within one of said visible overlay region and in proximity to the first link is performed independent of a selection using the cursor.

* * * * *